(12) United States Patent
Boehl et al.

(10) Patent No.: US 10,171,235 B2
(45) Date of Patent: Jan. 1, 2019

(54) USER-INITIATED MIGRATION OF ENCRYPTION KEYS

(71) Applicant: NXP B.V., Eindhoven (NL)

(72) Inventors: Florian Boehl, Leuven (BE); Jan René Brands, Nijmegen (NL)

(73) Assignee: NXP B.V., Eindhoven (NL)

( * ) Notice: Subject to any disclaimer, the term of this patent is extended or adjusted under 35 U.S.C. 154(b) by 240 days.

(21) Appl. No.: 15/159,216

(22) Filed: May 19, 2016

(65) Prior Publication Data

US 2017/0338948 A1  Nov. 23, 2017

(51) Int. Cl.
*H04L 29/06* (2006.01)
*H04L 9/08* (2006.01)
*H04W 4/80* (2018.01)
*H04L 9/14* (2006.01)
(Continued)

(52) U.S. Cl.
CPC ............ *H04L 9/0819* (2013.01); *H04L 9/083* (2013.01); *H04L 9/0816* (2013.01); *H04L 9/0822* (2013.01); *H04L 9/0825* (2013.01); *H04L 9/0861* (2013.01); *H04L 9/14* (2013.01); *H04L 9/321* (2013.01); *H04L 63/0442* (2013.01); *H04L 63/062* (2013.01); *H04L 63/067* (2013.01); *H04L 63/08* (2013.01); *H04L 67/10* (2013.01); *H04W 4/80* (2018.02);
(Continued)

(58) Field of Classification Search
None
See application file for complete search history.

(56) References Cited

U.S. PATENT DOCUMENTS 6,023,510 A * 2/2000 Epstein ................ G06Q 20/383
380/285
6,944,300 B2 * 9/2005 Challener ............. G06F 21/606
380/262

(Continued)

FOREIGN PATENT DOCUMENTS

WO    2015/133990 A1    9/2015

OTHER PUBLICATIONS

Extended European Search Report for Patent Appln. No. 17155339.9 (dated May 12, 2017).

*Primary Examiner* — Maung T Lwin (57) ABSTRACT

Embodiments utilizing secret keys for authentication and/or encrypted communication are described. In certain embodiments, authentication data is provided from a source network communication device to a target network communication device that allows a computing server to verify that the key migration is authorized by the source network communication device. The authentication data also enables the data provider and the target network communication device to independently determine a temporary key for establishing a secure communication channel between the service provider and the target network communication device and/or determine a new key for the target network communication device. In some implementations, the authentication data may be exchanged between the source and target network communication devices between offline without involvement of the computing server. When the target network communication device later connects to the computing server, the authentication data may be used to verify that the key migration is authorized and/or generate key(s).

20 Claims, 4 Drawing Sheets

(51) Int. Cl.
*H04L 9/32* (2006.01)
*H04L 29/08* (2006.01)

(52) U.S. Cl.
CPC .... *H04L 63/0435* (2013.01); *H04L 2463/061* (2013.01); *H04L 2463/062* (2013.01)

(56) References Cited

U.S. PATENT DOCUMENTS

| | | | |
|---|---|---|---|
| 7,516,321 B2 * | 4/2009 | Chen | H04L 9/3073 380/259 |
| 7,634,664 B2 * | 12/2009 | Ibrahim | G06F 21/606 705/51 |
| 7,673,151 B2 | 3/2010 | Rottschafer et al. | |
| 7,793,340 B2 * | 9/2010 | Kiester | H04L 9/3247 713/155 |
| 8,065,531 B2 | 11/2011 | Tobergte | |
| 8,265,265 B2 | 9/2012 | Van Rijnswou et al. | |
| 8,281,135 B2 * | 10/2012 | Smith | G06F 21/6218 380/228 |
| 8,295,489 B2 * | 10/2012 | Sung | H04L 63/061 380/277 |
| 8,489,873 B2 * | 7/2013 | Matsushima | G06F 21/10 713/150 |
| 8,555,063 B2 * | 10/2013 | Xiao | H04L 63/105 713/168 |
| 8,892,880 B2 | 11/2014 | Malzahn et al. | |
| 2006/0010324 A1 | 1/2006 | Appenzeller et al. | |
| 2007/0003064 A1 | 1/2007 | Wiseman et al. | |
| 2009/0103732 A1 | 4/2009 | Benteo et al. | |
| 2011/0051927 A1 | 3/2011 | Murray et al. | |
| 2011/0107095 A1 * | 5/2011 | Malzahn | G06F 21/10 713/168 |
| 2012/0011566 A1 * | 1/2012 | Youm | G06F 21/64 726/3 |
| 2015/0319151 A1 | 11/2015 | Chastain et al. | |

* cited by examiner

USER-INITIATED MIGRATION OF ENCRYPTION KEYS

Aspects of various embodiments are directed to applications utilizing secret keys for authentication and/or encrypted communication.

Secret keys are used by many applications to authenticate and securely communicate data via a data network between an application on a network communication device and a service provider, which manages access to one or more protected services, applications, or sets of data. As used herein, a "network communication device" and/or "device" refers to an apparatus having a communication circuit configured and arranged to communicate with a service provider and/or other network communication devices, via a network. In various applications, network communication devices may include, for example, mobile phones, smart phones, tablets, laptops, desktop computers, and/or various other network connected circuits. In some cases, knowledge of these keys may allow an unauthorized user access to one or more protected applications, services, or sets of data. In order to prevent unauthorized access to the protected applications, services, or sets of data, keys are commonly stored in a secure storage element on a network communication device. A secure storage element may, for example, be an embedded tamper-resistant integrated circuit on a network communication device. The secure element may implement security functions, such as cryptographic functions and authentication functions to restrict access to the data stored therein. Stored keys are never exposed to the system memory area of a computer system, and thus, stored private keys are protected from exposure to any unauthorized users.

For security reasons, keys may be generated and transferred to the secure storage element of a network communication device within a trusted environment, such as at a network communication device manufacture. However, at some point in time a user may wish to transfer a protected application, service, and/or set of data to a replacement or additional network communication device. To facilitate access to the protected application, service, and/or set of data, a key associated with the user at the service provider must be migrated to the new network communication device and stored in the secure storage element. Some key migration techniques reuse a secret key of the source network communication device for authentication of a target network communication device. However, this technique may require that each of the two network communication devices be configured to the same key derivation function for authentication using the secret key. This may not be possible in some implementations (e.g., that use a unique identifier of the network communication device as an input to the key derivation function). Moreover, if either of the two network communication devices becomes compromised (e.g., due to malicious attack), the secret key may be exposed—allowing the other network communication devices to be spoofed or otherwise compromised.

These and other matters have presented challenges to security and efficiencies for a variety of applications.

SUMMARY

Various example embodiments are directed to issues such as those addressed above and/or others which may become apparent from the following disclosure concerning distribution of keys for authentication and/or encryption. In certain example embodiments, aspects of the present disclosure involve methods and circuits for migration of keys, for authentication by a computing server, between network communication devices. A computing server refers to a network connected network communication device configured to provide one or more various services to network communication devices connected thereto via a data network. The provided services may include, for example, data storage, remote computing services, website hosting, virtual computing environments, home automation, media streaming service (e.g., on-demand music and/or video), telecommunication services (e.g., cellular communication, voice-over-IP, video-conferencing), or various combinations thereof. A computing server may comprise a single server or may comprise multiple distributed servers operating together (e.g., cloud-based services) to provide services to the network communication devices. Some more specific embodiments are directed toward user-controlled migration of keys (e.g., from a source network communication device to a target network communication device) for authentication by a computing server.

In certain embodiments, authentication data is provided from a source network communication device to a target network communication device that allows a computing server to verify that the key migration has been authorized by the source network communication device. The authentication data also enables the data provider and the target network communication device to independently determine a temporary key for establishing a secure communication channel between the service provider and the target network communication device and/or determine a new key for the target network communication device. In some implementations, the authentication data may be exchanged between the source and target network communication devices offline without involvement of the computing server. When the target network communication device later connects to the computing server, the authentication data may be used to verify that the key migration is authorized and/or generate key(s).

In an example embodiment, a communication circuit on the computing server is used to authenticate a first network communication device using a first key. The first key is derived from a master key stored at the computing server and from a first set of key derivation data stored on the first network communication device. A data migration request is received by the computing server from a second network communication device in the data network. The data migration request specifies the first set of key derivation data and specifying a second set of key derivation data stored at the second network communication device. In response to receiving the data migration request, a processing circuit on the computing server is used to determine a temporary key used by the second network communication device based on the first and second sets of derivation data and the master key. A second key is generated by the processing circuit based on the master key and the second set of key derivation data. Using the communication circuit, the second key is provided to the second network communication device via a secure communication channel established using the temporary key. The second network communication device is subsequently authenticated using the second key.

In another example embodiment, a source and target network communication devices are configured to perform key migration in accordance with one or more embodiments. The source network communication device is configured to communicate with a computing server connected in a data network using a first key for authentication. The first key is derived from a master key stored at the data sever and from a second set of key derivation data stored at the second network communication device. At a target network communication device, a first set of key derivation data is provided to the source network communication device using a communication circuit of the target network communication device. A second set of key derivation data and a set of authorization data is received from the second network communication device via the communication circuit. The authorization data is derived from the first key and the first set of key derivation data using a one way function. A temporary key is determined. A data migration request is generated that includes verification data, from which the temporary key can be determined using the master key and authorization by the second network communication device can be verified. The verification data includes the first and second sets of key derivation data. The data migration request is provided to the computing server using the communication circuit. The computing server generates a second key based on the master key and the second set of key derivation data. The target network communication device receives the second key from the computing server via a secure communication channel established using the temporary key. The processing circuit communicates with the computing server, via the communication circuit using the second key for authentication.

In another example embodiment, a computing server includes a data storage circuit storing a master key. The computing server also includes a communication circuit configured and arranged to communicate data with a plurality of network communication devices connected in a data network. The computing server also includes a processing circuit connected to the communication circuit. The processing circuit is configured and arranged to authenticate a source network communication device, via the communication circuit, using the first key. The first key is derived from the master key and a first set of key derivation data stored on the first network communication device. In response to receiving a data migration request from a second network communication device in the data network, via the communication circuit, the processing circuit determines a temporary key used by the second network communication device. The temporary key is determined based on first and second sets of key derivation data specified in the data migration request and the master key. The processing circuit generates a second key, based on the master key and the second set of key derivation data. The processing circuit provides the second key to the second network communication device, via the communication circuit, using a secure communication channel established using the temporary key. The processing circuit is configured to subsequently authenticate the second network communication device, via the communication circuit, using the second key.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving generation, distribution and or use of keys for encryption and/or authentication. In certain implementations, aspects of the present disclosure have been shown to be beneficial when used in the context of cloud-based services provided to end-user network communication devices via a data network. As an illustrative example, a cellular service provider may backup a list of contacts for an end-user at a computing server. Access to the backup list may be restricted to network communication devices authenticated by keys specified for network communication devices of the end-user. While not necessarily so limited, various aspects may be appreciated through the following discussion of non-limiting examples which use exemplary contexts.

Certain embodiments relate to migration of keys used for restricting access to a network communication device, service, function, and/or data, from a first network communication device of an end-user (i.e., a source network communication device) to a second network communication device of the end-user (i.e., a target network communication device). In one or more embodiments, key migration is performed without revealing the key used by the source network communication device. The source network communication device provides the target network communication device with a set of verification data that can be used to verify authorization by the source network communication device and establish a temporary key for communicating a new key from the computing server to the target network communication device. In some embodiments, keys for the source and target network communication devices are generated based on a master key stored at a computing server and key derivation data values stored in the network communication devices. Accordingly, the key derivation data may be used to indicate to a computing server the key of the source network communication device used to generate a temporary key and/or a token for authentication. For ease of reference, key derivation data stored at the source network communication device may be referred to as source key derivation data. Key derivation data stored at the target network communication device may be referred to as target key derivation data. A key generated for the source network communication device from the master key and the source key derivation data may be referred to as a source key. A key generated for the target network communication device from the master key and the target key derivation data may be referred to as a target key.

As an example migration process, the source network communication device may generate a temporary key from the source key using a predetermined key derivation function. The temporary key and source key derivation data are provided to the target network communication device. At a later time, the target network communication device may provide the source key derivation data to a computing server. Using a master key and the source key derivation data, the source key may be determined. The computing server may then use the source key to regenerate a temporary key provided to the target network communication device using the predetermined key derivation function. The computing server then establishes a secure communication channel with the target network communication device using the temporary key. If the secure communication channel is successfully established, it is inferred that the key migration to the target network communication device is authorized by the source network communication device. A target key may then be provided to the target network communication device via the secure communication channel.

As another example, the temporary key may be generated by the target network communication device and encrypted (e.g., using a public key of the computing server). The encrypted temporary key is provided to the source network communication device and encrypted or signed by the source network communication device using the source key. The result and the source key derivation data may then be provided to the computing server by the source network communication device or via the target network communication device. As in the previous example, the computing server may determine the source key from the source key derivation data and master key. The source key may then be used to verify that the key migration is authorized by the source network communication device. Using a private key corresponding to the public key of the computing server, the temporary key may be decrypted and used to establish a secure communication channel with the target network communication device. A target key may then be provided to the target network communication device via the secure communication channel.

In these examples, authorization for the key migration is verified by the computing server before providing a target key to the target network communication device. In some embodiments, the computing server may be configured to prevent the key migration from being completed in response to certain criteria being satisfied. For instance, the computing server may prevent the migration in response to an indication that the source network communication device may be compromised. Compromise of the network communication device may be detected, for example, based an analysis of network traffic to or from the network communication device. For example, network traffic resembling port scans of other network communication devices may indicate that the network communication device may be compromised. As another example, large number of data transactions with the computing server (e.g., above a threshold number) may be indicative of a compromised network communication device. In some embodiments, the computing server may be configured to prevent the key migration from being completed, if the source network communication device may be compromised, until migration is confirmed via a secondary authorization mechanism (e.g., via email, text message, automated phone call, or a combination thereof).

In some embodiments, a computing server may prevent key migration to enforce license restrictions. For instance, key migration may be used to limit the number of network communication devices for a user account which are to be allowed access to a restricted service. As an illustrative example, a cloud-based application may restrict the number of network communication devices for a user account that may access the application. Similarly, a streaming media service may wish to restrict the number of network communication devices that are provided streaming access for a user account. If a user account has keys generated for the maximum number of network communication devices, the computing server may prevent data migration to a new network communication device for the account until a user selects to remove a previous key.

In different embodiments the source/target keys and temporary keys may be generated using various key derivation functions. A key derivation function generates one or more keys from one or more input values such as a master key, key derivation data, or other known information such as a password, passphrase, or pseudo-random function. Various example key derivation functions that may be used are described in NIST SP 800-108, Recommendation for Key Derivation Using Pseudorandom Functions, National Institute of Standards and Technology, incorporated herein by reference. Some non-limiting examples described therein include counter-mode KDF defined in MST SP800-108 with CMAC-AES128 from NIST SP800-38B, the NIST counter-mode KDF defined in MST SP800-108 with keyed-HMAC-SHA256 from FIPS 198-1.

In some embodiments, the key derivation data may include a value stored, for example, in a non-volatile memory or secure storage element of each network communication device. Alternatively or additionally, the key derivation data may include values derived from a physical property of the network communication devices (e.g., by a physically unclonable function).

In the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Figure 1:
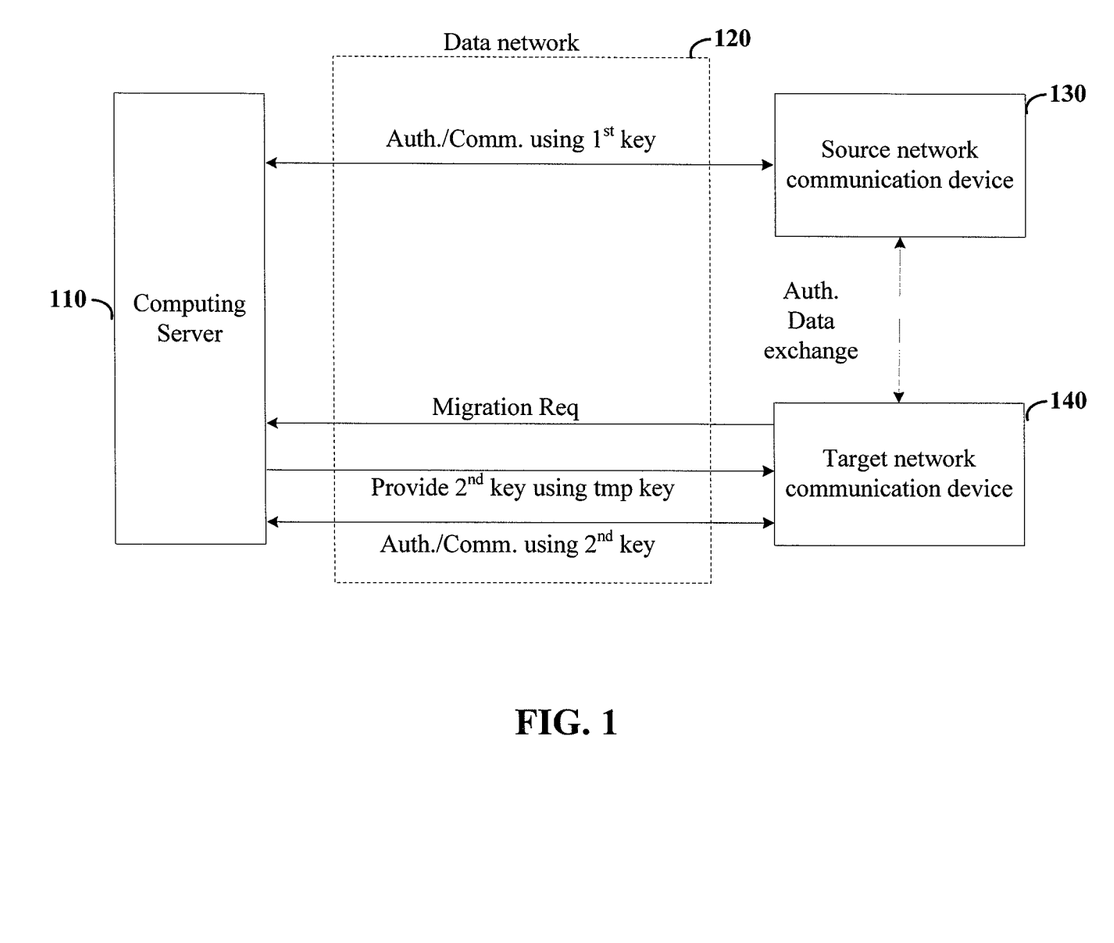
FIG. 1 shows a first process for migration of authentication key data, in accordance with the present disclosure.

Turning now to the figures, FIG. 1 shows an example process for migration of authentication key data, in accordance with the present disclosure. In this example, a computing server 110 is configured to provide one or more services for network communication devices (e.g., source network communication device 130 and target network communication device 140), which are communicatively connected to the computing server 110 via a data network 120. The computing server is configured to authenticate and/or communicate with each network communication device using unique respective keys (e.g., generated for each network communication device based on a master key stored at the computing server and key derivation data stored at the respective network communication devices). Initially, the computing server 110 is configured to authenticate the source network communication device and/or communicate with the source network communication device 130 using a first key derived from the master key and key derivation data of the source network communication device.

The computing server 110 is configured to migrate a key to a target network communication device 140 in response to receiving a migration request from the target network communication device. The migration request includes data that enables the computing server 110 to verify authorization of the migration by the source network communication device 130 and also determine a temporary key used by the target network communication device 140. The data in the migration request used for verification and determination of the temporary key may be generated/retrieved by the target network communication device via an exchange of the authentication data between the source and destination network communication devices, for example, as described with reference to FIGS. 2 and 3. The computing server 110 generates a second key for the target network communication device 140 (e.g., based on the master key and key derivation data for the target network communication device). The computing server 110 provides the second key to the target network communication device 140 using the determined temporary key (e.g., to establish a secure communication channel). Thereafter, the computing server uses the second key for authentication of and/or communication with the target network communication device 140.

Figure 2:
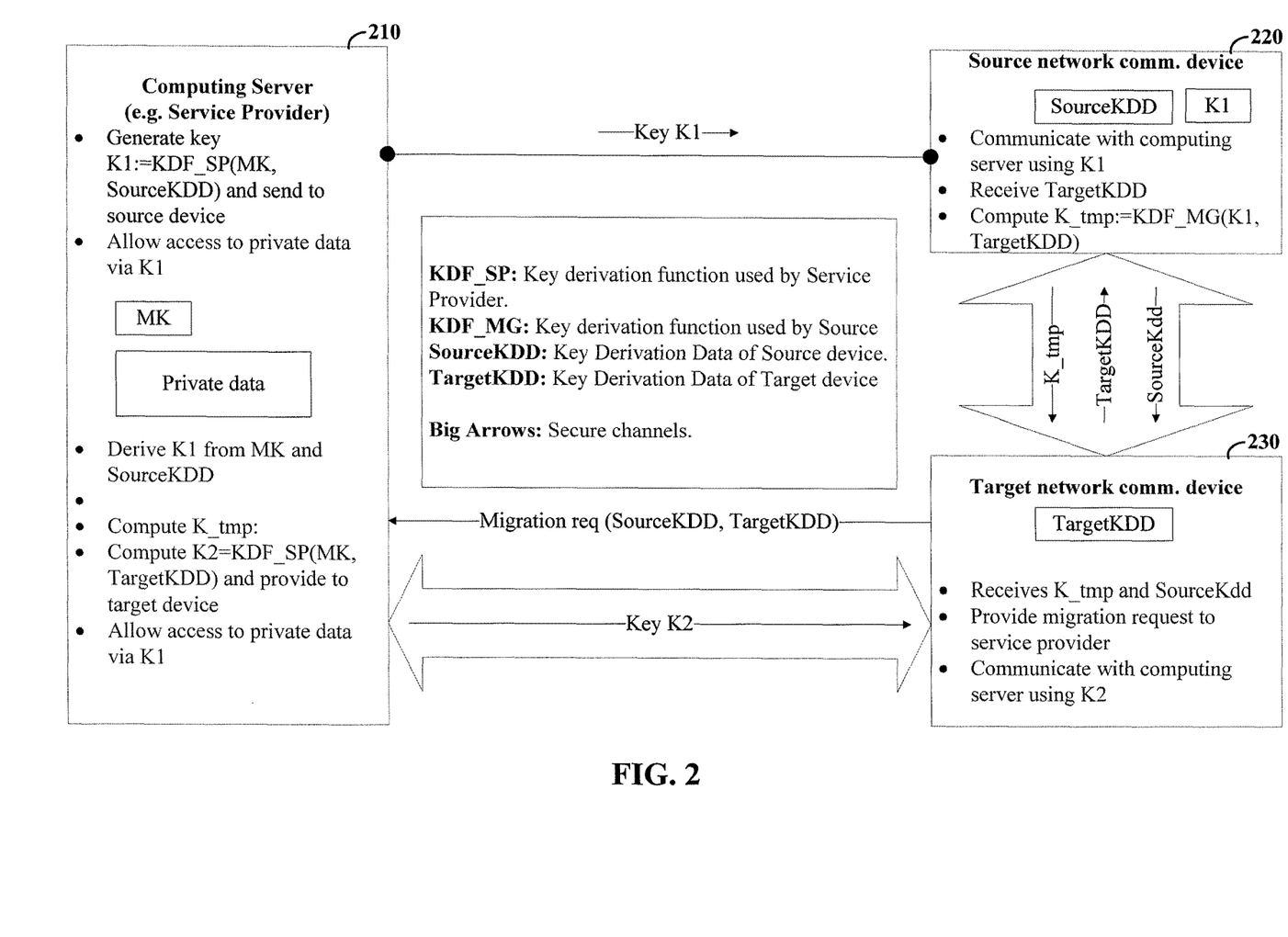
FIG. 2 shows a second process for migration of authentication key data, in accordance with the present disclosure.

FIG. 2 shows another process for migration of authentication key data, in accordance with the present disclosure. Computing server 210 is configured to provide one or more services for network communication devices (e.g., source network communication device 220 and target network communication device 230) communicatively connected to the computing server 210 via a data network. As previously described, the computing server may authenticate and/or establish secure communications using respective keys generated for each network communication device based on a master key (MK) and a set of key derivation data (e.g., SourceKDD or TargetKDD), which is unique to each network communication device.

In this example, a first key K1 is initially generated by the computing server for the source network communication device using key derivation function KDF_SP. KDF_SP generates the first key K1 from the master key MK and a set of key derivation data, SourceKDD retrieved from the source network communication device. The generated key is communicated to and stored in the source network communication device (e.g., in a secure storage element). In some implementations, the key K1 may be stored in the source network communication device 220 by a manufacture prior to shipping. In some other implementations, the key K1 may be stored in the source network communication device 220 when a network communication device is first initialized, connected to the computing server via a secure communication channel, and authenticated using a secondary means (e.g., an initial passcode provided by a service provider in a welcome packet). Thereafter, the source network communication device 220 uses the first key K1 to authenticate and/or establish secure communication with the computing server 210.

A predetermined second key derivation function KDF_MG is also stored in the source network communication device (e.g., by the manufacture or when initialized) to facilitate migration of keys to new network communication devices. When a user initiates key migration to a target network communication device 230, a secure communication channel is established between the source network communication device 220 and the target network communication device 230. The target network communication device provides a set of key derivation data (TargetKDD) to the source network communication device 220. The source network communication device generates a temporary key (K_tmp) using TargetKDD as input to the second key derivation function KDF_MG. The source network communication device 220 communicates a set of authentication data, including the temporary key K_tmp and SourceKDD to the target network communication device 230.

The target network communication device 230 provides a key migration request to the computing server 210. In this example, the key migration request includes SourceKDD and TargetKDD. The computing server 210, regenerates the first key K1 used by the source network communication device 220 using KDF_SP with MK and SourceKDD as inputs. Using the predetermined second key derivation function KDF_MG, with K1 and TargetKDD as inputs, the computing server determines the temporary key K_tmp that was provided to the Target network communication device 230.

A second key K2 is generated for the target network communication device 230 using the first key derivation function KDF_SP with MK and TargetKDD as inputs. The computing server 210 establishes a secure communication channel with the target network communication device 230 using the temporary key. If the secure communication channel is successfully established, it is inferred that the key migration to the target network communication device is authorized by the source network communication device. The second key K2 is communicated to the target network communication device 230 via the secure communication channel. Thereafter, the target network communication device 230 uses the second key K2 for authentication and/or for establishing secure communication with the computing server 210.

In this manner, authorization by the source network communication device 220 is verified and a key is migrated to the target network communication device without revealing the first key K1 used by the source network communication device 220 or the master key MK stored at the data server. However, one disadvantage of the process shown in FIG. 2 is that the temporary key K_tmp is known to the source network communication device 220. If the source network communication device is compromised, malicious code may use K_tmp to monitor the secure communication between the data server 210 and the target network communication device 230 and acquire the key K2 generated for the target network communication device 230.

Figure 3:
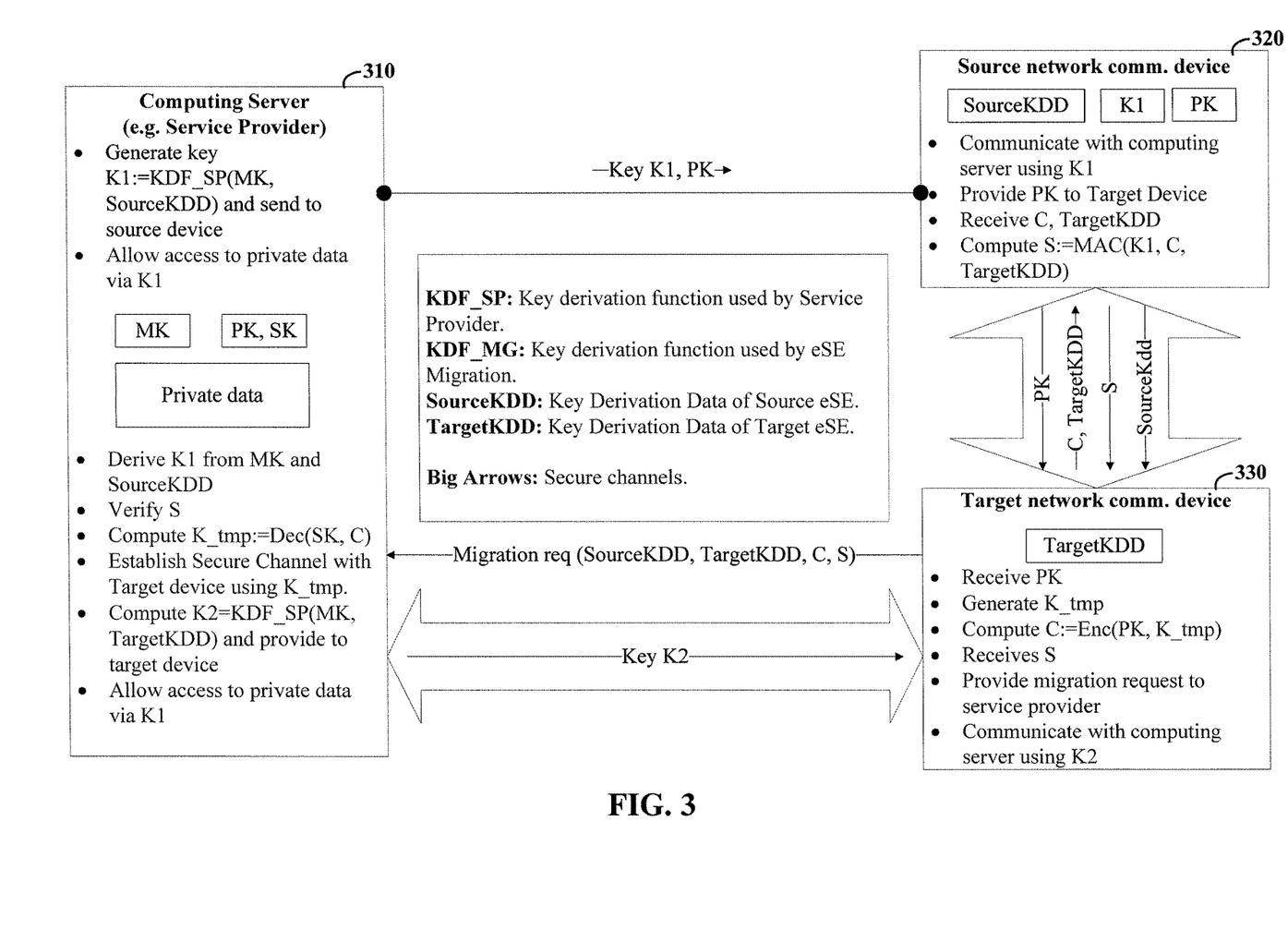
FIG. 3 shows a second process for migration of authentication key data, in accordance with the present disclosure.

FIG. 3 shows another example process for migration of authentication key data in accordance with the present disclosure. Computing server 310 is configured to provide one or more services for network communication devices (e.g., source network communication device 320 and target network communication device 330) communicatively connected to the computing server 310, as described with reference to computing server 210 in FIG. 2. A first key K1 is initially generated by the computing server for the source network communication device using key derivation function KDF_SP. KDF_SP generates the first key K1 from the master key MK and a set of key derivation data, SourceKDD retrieved from the source network communication device 330. The generated key is communicated to and stored in the source network communication device 320 as described with reference to source network communication device 220 in FIG. 2.

In this example, a public key PK of an asymmetric key pair (PK, SK) used by the computing server 310 is also provided to the source network communication device 320 to facilitate key migration to new network communication devices without revealing a temporary key to the source network communication device 320. When a user initiates key migration to a target network communication device 330, a secure communication channel is established between the source network communication device 320 and the target network communication device 330. The source network communication device 320 provides the public key PK and key derivation data SourceKDD to the target network communication device 330. The target network communication device 330 generates a temporary key (K_tmp) to be used to establish a secure communication channel with the computing server 310. The target network communication device 330 encrypts the temporary key K_tmp with the public key PK to produce an encrypted key (C). The target network communication device 330 provides the encrypted key C to the source network communication device. Since the secret key SK of the computing server 310 is not known to the source network communication device, the source cannot decrypt C to retrieve the temporary key K_tmp. The source network communication device 320 computes a message authentication code (S), or other authorization value, using the first key K1, Target KDD, and the encrypted temporary key C as inputs and provides S to the target network communication device.

The target network communication device 330 provides a key migration request to the computing server 310. In this example, the key migration request includes SourceKDD, TargetKDD, the encrypted key C, and the authentication value S. The computing server 310, regenerates the first key K1 used by the source network communication device 320 using KDF_SP with MK and SourceKDD as inputs. Using the same message authentication code function as the source network communication device 320, the data server re-computes S to verify that the key migration to the target network communication device 330 is authorized by the source network communication device 320.

If S is verified, the computing server 310 decrypts C using the secret key SK of the asymmetric key pair to retrieve the temporary key K_tmp. A second key K2 is generated for the target network communication device 330 using the first key derivation function KDF_SP with MK and TargetKDD as inputs. The computing server 310 establishes a secure communication channel with the target network communication device 330 using the temporary key K_tmp and communicates the second key K2 to the target network communication device 330. Thereafter, the target network communication device 330 uses the second key K2 for authentication and/or for establishing secure communication with the computing server 310.

In this manner, authorization by the source network communication device 320 is verified and a new key K2 is migrated to the target network communication device without revealing the first key K1 or master key MK to the target network communication device and also without revealing the temporary key K_tmp or the second key K2 to the source network communication device. Accordingly, intrusion of malicious code can be mitigated if one of the source or target network communication devices becomes corrupted before or following key migration.

TABLE 1 shows possible corruption of network communication devices that may occur using the key migration processes shown in FIGS. 2 and 3 and processes that reuse keys for key migration to new network communication devices. In different scenarios, the possible corruption may differ depending on which network communication device is initially corrupted and whether corruption occurred before (a prio) or following (a post) key migration. Possible corruption for key migration techniques that reuse the key of the source network communication device for the target network communication device is shown in the first row of table 1. Regardless of which network communication device is corrupted, or when corruption occurs, both source and target network communication devices may become corrupted since both use the same key.

TABLE 1

|  | Source corrupted (a prio.) | Source corrupted (a post.) | Target corrupted (a prio.) | Target corrupted (a post.) |
| --- | --- | --- | --- | --- |
| Key migration using key reuse | S & T corrupted | S & T corrupted | S & T corrupted | S & T corrupted |
| Key migration process of FIG. 2 | S & T corrupted | S & T corrupted(*) | T corrupted | T corrupted |
| Key migration process of FIG. 3 | S corrupted | S corrupted | T corrupted | T corrupted |

Possible corruption for the key migration process shown in FIG. 2 is shown in the second row of table 1. As the process of FIG. 2 does not reveal the source key K1 to the target network communication device, the source network communication device will not become corrupted if the target becomes corrupted. However, as previously described, the second key provided to the target network communication device may be determined and used to corrupt the target network communication device if the source network communication device is corrupted prior to key migration since the temporary key is known to the source network communication device. Corruption of the source network communication device following migration may also lead to corruption of the target if the source becomes corrupted prior to the second key being provided to the target network communication device. After the second key being provided to the target network communication device, the temporary key is no longer used and cannot be used to corrupt the target network communication device.

Possible corruption for the key migration process shown in FIG. 3 is shown in the third row of table 1. As previously described, the process shown in FIG. 3 does not reveal the temporary key to the source network communication device and does not reveal the first key K1 of the source network communication device to the target network communication device. Accordingly, regardless of which network communication device becomes corrupted, or when corruption occurs, key data know to the corrupted network communication device cannot be used to corrupt the other network communication device.

Figure 4:
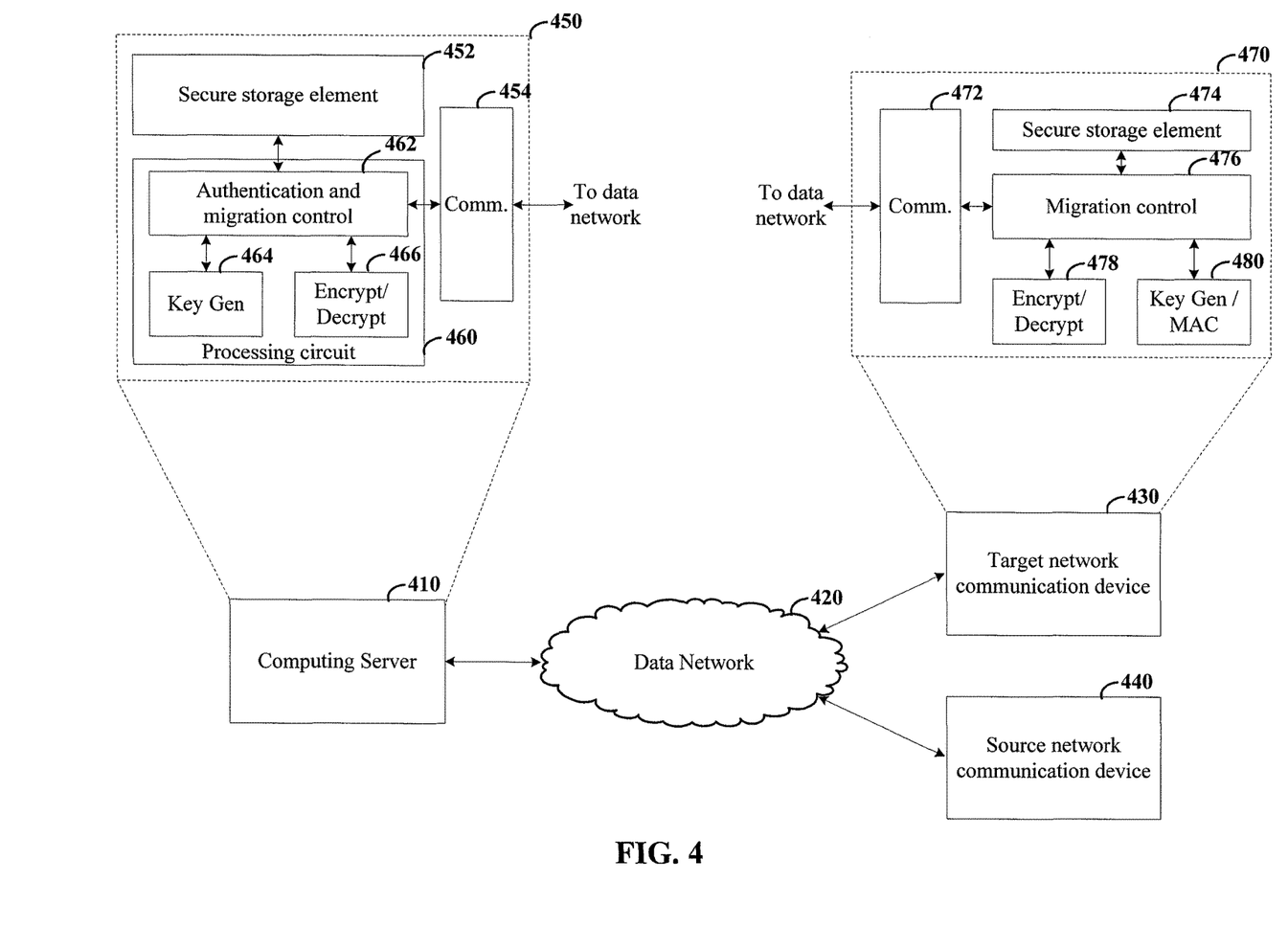
FIG. 4 shows a system configured to perform migration of authorization keys, in accordance with the present disclosure.

FIG. 4 shows a system configured to perform migration of authorization keys, in accordance with the present disclosure. In this example, the system includes a computing server 410 configured to provide one or more services for network communication devices (e.g., target network communication device 430 and source network communication device 440), which are communicatively connected to the computing server 410 via a data network 420. The computing server may authenticate and/or establish secure communications using unique respective keys generated for each network communication device 430 or 440 based on a master key (MK) and a set of key derivation data (e.g., SourceKDD or TargetKDD).

In some embodiments, the computing server 410, source network communication device 440, and target network communication device 430 may be configured to migrate keys from the source network communication device 440 to the target network communication device 430, for example, using the key migration process with reference to computing server 210, source network communication device 220, and target network communication device 230 in FIG. 2. Alternatively, in some embodiments, the computing server 410, source network communication device 440, and target network communication device 430 may be configured to migrate keys from the source network communication device 440 to the target network communication device 430, for example, using the key migration process with reference to computing server 310, source network communication device 320, and target network communication device 330 in FIG. 3. In some embodiments, the source and target network communication devices 430 and 440 may select the process used for key migration based on the capabilities of the computing server 410. Conversely, in some embodiments, the computing server 410 may select the process used for key migration based on the capabilities of the source and target network communication devices 430 and 440.

In different embodiments, the computing server 410, target network communication device 430, and/or the source network communication device 440 may include various different circuit arrangements to perform key migration as described with reference to the above described processes. Block 450 shows an example circuit arrangement that may be used to implement the computing server 410 in some embodiments. The example circuit arrangement includes a communication circuit configured to communicate data over the data network 420. The communication circuit 454 may be implemented using, for example, a network interface circuit configured to communicate data over a data network according to a communication protocol (e.g., Ethernet, WiFi, CDMA, GSM, Bluetooth, ZWave, Zigbee, and/or various IEEE 802.X protocols). The circuit arrangement also includes a secure storage element 452 configured to store keys used by the computing server 410 (e.g., MK, (PK, SK)), key derivation functions, and/or private data.

A processing circuit 460 is connected to the secure storage element and the communication circuit. The processing circuit is configured to authenticate network communication devices 430 and 440 via the communication circuit 454 and perform operations for key migration as described with reference to computing servers 210 and 310 in FIGS. 2 and 3. In this example, the processing circuit 460 includes a circuit 464 for generation of keys for the source and target network communication devices 430 and 440 as previously described. Some example circuit arrangements for generation cryptographic keys are discussed in more detail in U.S. Pat. No. 8,265,265, titled Circuit Arrangement and Method for RSA Key Generation, which is fully incorporated by reference herein. In this example, the processing circuit 460 includes a circuit 466 for encryption and decryption of data for secure communication with the source and target network communication devices 430 and 440 as previously described. Some example circuit arrangements and processes for encryption and decryption are discussed in more detail in U.S. Pat. No. 7,673,151, titled Processor For Encrypting And/Or Decrypting Data And Method Of Encrypting And/Or Decrypting Data Using Such A Processor, and in U.S. Pat. No. 8,065,531, titled Decryption Method, which are fully incorporated by reference herein. Authentication and migration control circuit 462 is configured to authenticate network communication devices 430 and 440 via the communication circuit 454 and perform operations for key migration, as described with reference to computing servers 210 and 310 in FIGS. 2 and 3, using the circuits 464 and 466, and data stored in secure storage element 452.

Block 470 shows an example circuit arrangement that may be used to implement the target network communication device 430 and/or source network communication device 440 in some embodiments. The example circuit arrangement 470 includes a communication circuit similar to communication circuit 454. The circuit arrangement 470 includes a secure storage element 474 configured to store key derivation data and/or keys received from the computing server 410. The circuit arrangement 470 includes a circuit 478, similar to circuit 466, for encryption and decryption of data for secure communication the computing server 410 and/or other network communication devices via the data network.

In this example, the circuit arrangement 470 includes a circuit 480, similar to circuit 464, for generation of keys (e.g., a temporary key) as previously described. In some implementations, the circuit 480 may also include a circuit for generating message authentication codes. Some example circuit arrangements for generation message authentication codes are discussed in more detail in U.S. Application Pub. 2011/0051927, titled Device For Generating A Message Authentication Code For Authenticating A Message, which is fully incorporated by reference herein. A migration control circuit, 476 is connected to the secure storage element 474, communication circuit 472 and circuits 478 and 480. The migration control circuit is configured to perform operations of the key migration processes, as described with reference to the source and target network communication devices 220 and 230 in FIG. 2 or the source and target network communication devices 320 and 330 in FIG. 3.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or use terms such as blocks, modules, network communication device, system, unit, controller, element and/or other circuit-type depictions (e.g., reference numerals 350 and 370 depict a block/module as described herein). Such circuits or circuitry are used together with other elements to exemplify how certain embodiments may be carried out in the form or structures, steps, functions, operations, activities, etc. For example, in certain of the above-discussed embodiments, one or more illustrated items in this context represent circuits (e.g., discrete logic circuitry or (semi-) programmable circuits) configured and arranged for implementing these operations/activities, as may be carried out in the approaches shown in FIGS. 1, 2, 3, and 4. In certain embodiments, such illustrated items represent one or more computer circuitry (e.g., microcomputer or other CPU) which is understood to include memory circuitry that stores code (program to be executed as a set/sets of instructions) for performing a basic algorithm or the more complex processes/algorithms as described with reference to FIGS. 1 and 2 to perform the related steps, functions, operations, activities, etc. The specification may also make reference to an adjective that does not connote any attribute of the structure ("first [type of structure]" and "second [type of structure]") in which case the adjective is merely used for English-language antecedence to differentiate one such similarly-named structure from another similarly-named structure (e.g., "first circuit configured to convert . . . " is interpreted as "circuit configured to convert . . . "). On the other hand, the specification may make reference to an adjective that is intended to connote an attribute of the structure (e.g., a monitor server), in which case the adjective (e.g., monitor) modifies to refer to at least a portion of the named structure (e.g., server) is configured to have/perform that attribute (e.g., monitor server refers to at least a portion of a server that includes/performs the attribute of monitoring.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed is:

1. A method, comprising:
   storing a master key in a non-volatile memory;
   using a communication circuit of a computing server,
      authenticating a first network communication device in a data network using a first key, wherein the first key is derived from the master key and a first set of key derivation data stored on the first network communication device, and
      receiving a data migration request from a second network communication device in the data network, the data migration request specifying the first set of key derivation data and specifying a second set of key derivation data stored at the second network communication device;
   in response to receiving the data migration request, using a processing circuit of the computing server to
      determine a temporary key used by the second network communication device based on the first and second sets of key derivation data and the master key, and
      generate a second key based on the master key and the second set of key derivation data; and
   using the communication circuit,
      providing the second key to the second network communication device via a secure communication channel established using the temporary key, and
      authenticating the second network communication device using the second key.

2. The method of claim 1, further comprising:
   using the communication circuit of the computing server, receiving the first set of key derivation data from the first network communication device in the data network connected to the communication circuit; and
   using the processing circuit of the computing server, generating the first key based on the master key and the first set of key derivation data.

3. The method of claim 1, wherein
   the temporary key used by the second network communication device is generated by the first network communication device using the first key and the second set of key derivation data; and
   the determining of the temporary key includes
      deriving the first key from the first set of key derivation data in the data migration request and the master key, and
      deriving the temporary key from the first key and the second set of key derivation data.

4. The method of claim 1, further comprising
   using the processing circuit, deriving the first key from the first set of key derivation data in the data migration request and the master key;
   wherein the data migration request received from the second network communication device includes
      the temporary key encoded with a public key of an asymmetric key pair, and
      an authentication data value generated by the first network communication device using the first key, the second set of key derivation data, and the encoded temporary key; and
   wherein the providing of the second key to the second network communication device is performed in response to verifying the authentication data value in the authentication data value using the derived first key.

5. The method of claim 1, further comprising in response to authenticating the first network communication device, providing a protected set of data stored by the computing server to the first network communication device via a secure communication channel.

6. The method of claim 1, further comprising in response to authenticating the first network communication device, performing a key-restricted set of operations for the first network communication device.

7. A method, comprising:
   using a communication circuit of a first network communication device connected in a data network,
      providing a first set of key derivation data to a second network communication device connected to the communication circuit via the data network, the second network communication device being configured to communicate with a computing server connected in the data network using a first key for authentication, the first key being derived from a master key stored at the computing server and from a second set of key derivation data stored at the second network communication device,
      receiving, from the second network communication device, authorization data derived from the first key and from the first set of key derivation data using a one way function, and
      receiving the second set of key derivation data from the second network communication device;
   using a processing circuit of the first network communication device,
      determining a temporary key, and
      generating a data migration request including verification data from which the temporary key can be determined using the master key and authorization by the second network communication device can be verified, the verification data including the first and second sets of key derivation data; and
   using the communication circuit of first network communication device,
      providing the data migration request to the computing server,
      receiving a second key from the computing server via a secure communication channel established using the temporary key; and
      communicating with the computing server using the second key for authentication.

8. The method of claim 7, wherein the temporary key is specified by the authorization data received from the second network communication device.

9. The method of claim 7, further comprising:
receiving a public key of the computing server from the second network communication device;
encoding the temporary key using the public key;
providing the encoded temporary key to the second network communication device; and
wherein the authorization data received from the second network communication device is derived from the first key, the first set of key derivation data, and the encoded temporary key using the one way function.

10. The method of claim 9, wherein the verification data in the data migration request includes the encoded temporary key and the authorization data.

11. An apparatus, comprising a computing server including:
a data storage circuit storing a master key;
a communication circuit configured and arranged to communicate data with a plurality of network communication devices connected in a data network;
a processing circuit connected to the communication circuit and configured and arranged to:
  authenticate a first network communication device, via the communication circuit, using a first key, wherein the first key is derived from the master key and a first set of key derivation data stored on the first network communication device;
  in response to receiving a data migration request from a second network communication device in the data network, via the communication circuit, determine a temporary key used by the second network communication device based on the first set of key derivation data and a second set of key derivation data specified in the data migration request and the master key;
  generate a second key based on the master key and the second set of key derivation data;
  provide the second key to the second network communication device, via the communication circuit, using a secure communication channel established using the temporary key; and
  authenticate the second network communication device, via the communication circuit using the second key.

12. The apparatus of claim 11, wherein the processing circuit is further configured and arranged to:
receive the first set of key derivation data, via the communication circuit, from the first network communication device connected in the data network;
generate the first key for the first network communication device based on the master key stored in the data storage circuit and the first set of key derivation data received from the first network communication device; and
provide the first key to the first network communication device via the communication circuit.

13. The apparatus of claim 11, wherein the processing circuit is further configured and arranged to provide the first network communication device access to a protected set of data stored in the data storage circuit via the communication circuit using a secure communication channel established using the first key.

14. The apparatus of claim 11, wherein the processing circuit includes
a key generation circuit configured and arranged to implement a key derivation function;
an encryption/decryption circuit; and
an access control circuit configured and arranged to restrict access to a protected set of data to authenticated with the first and second keys.

15. The apparatus of claim 11, wherein
the data migration request includes the temporary key encrypted with a public key of an asymmetric key pair stored in the data storage circuit; and
the processing circuit is configured and arranged to
  decrypt the encrypted temporary key using a private key of the asymmetric key pair and compare the decrypted result to the determined temporary key; and
  provide the generated second key to the second network communication device in response to the decrypted result matching the determined temporary key.

16. The apparatus of claim 11, wherein the processing circuit is configured and arranged to prevent the generated second key from being provided to the second network communication device in response to a set of criteria being satisfied.

17. The apparatus of claim 11, wherein the processing circuit is configured and arranged to, in response to network traffic indicating that the first network communication device may be compromised,
prevent the generated second key from being provided to the second network communication device until authorization for transfer of the second key is verified by a user via an email, text message, automated call, or a combination thereof.

18. The apparatus of claim 11, wherein
the first key is included in a set of keys for a user account; and
the processing circuit is configured and arranged to prevent the generated second key from being provided to the second network communication device in response to a number of keys in the set of keys for the user account exceeding a threshold.

19. The apparatus of claim 11, further comprising:
the first network communication device, wherein the first network communication device includes
  a first circuit configured and arranged to communicate data via the data network; and
  a second circuit connected to the first circuit and configured and arranged to, in response to receiving the second set of key derivation data via the first circuit, generate the temporary key based on the first key and the second set of key derivation data and provide the temporary key to the second network communication device via the first circuit; and
the second network communication device, wherein the second network communication device includes
  a third circuit configured and arranged to communicate data via the data network; and
  a fourth circuit connected to the third circuit and configured and
  arranged to
    provide the second set of key derivation data to the first network communication device via the third circuit, and
    in response to receiving the temporary key, generate the data migration request and provide the data migration request to the computing server via the third circuit.

20. The apparatus of claim 11, further comprising:
the first network communication device, wherein the first network communication device includes a first circuit configured and arranged to communicate data via the data network; and a second circuit connected to the first circuit and configured and arranged to, in response to receiving an encrypted temporary key from the second network communication device via the third circuit, derive authentication data from the encrypted temporary key and the first key and provide the authentication data to the second network communication device; and the second network communication device, wherein the second network communication device includes a third circuit configured and arranged to communicate data via the data network; and a fourth circuit connected to the third circuit and configured and arranged to in response to receiving a public key of the computing server from the first network communication device via the third circuit, generate the temporary key, encrypt the temporary key with the public key to produce the encrypted temporary key, and provide the encrypted temporary key to the first network communication device via the data network; and generate the data migration request in response to receiving the authentication data, the data migration request including the first and second sets of key derivation data, the encrypted temporary key, and the authentication data.

* * * * *